Figure 10:
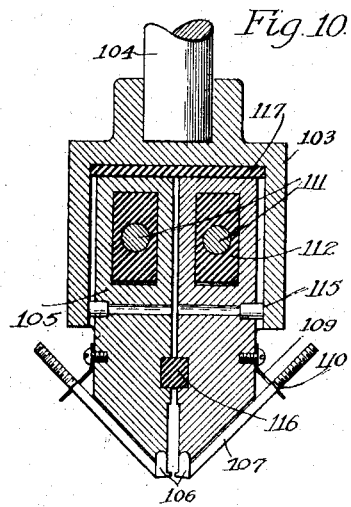

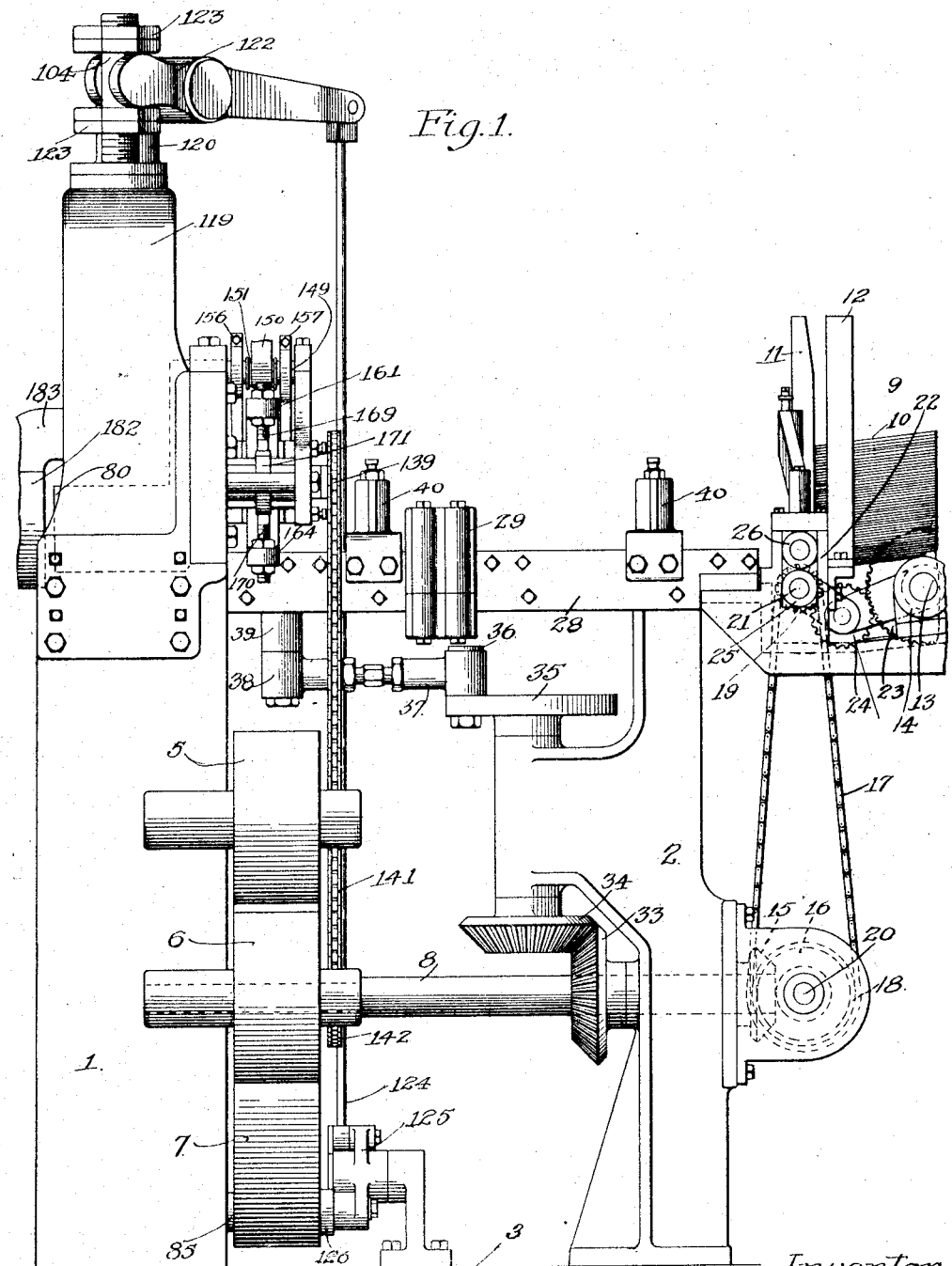

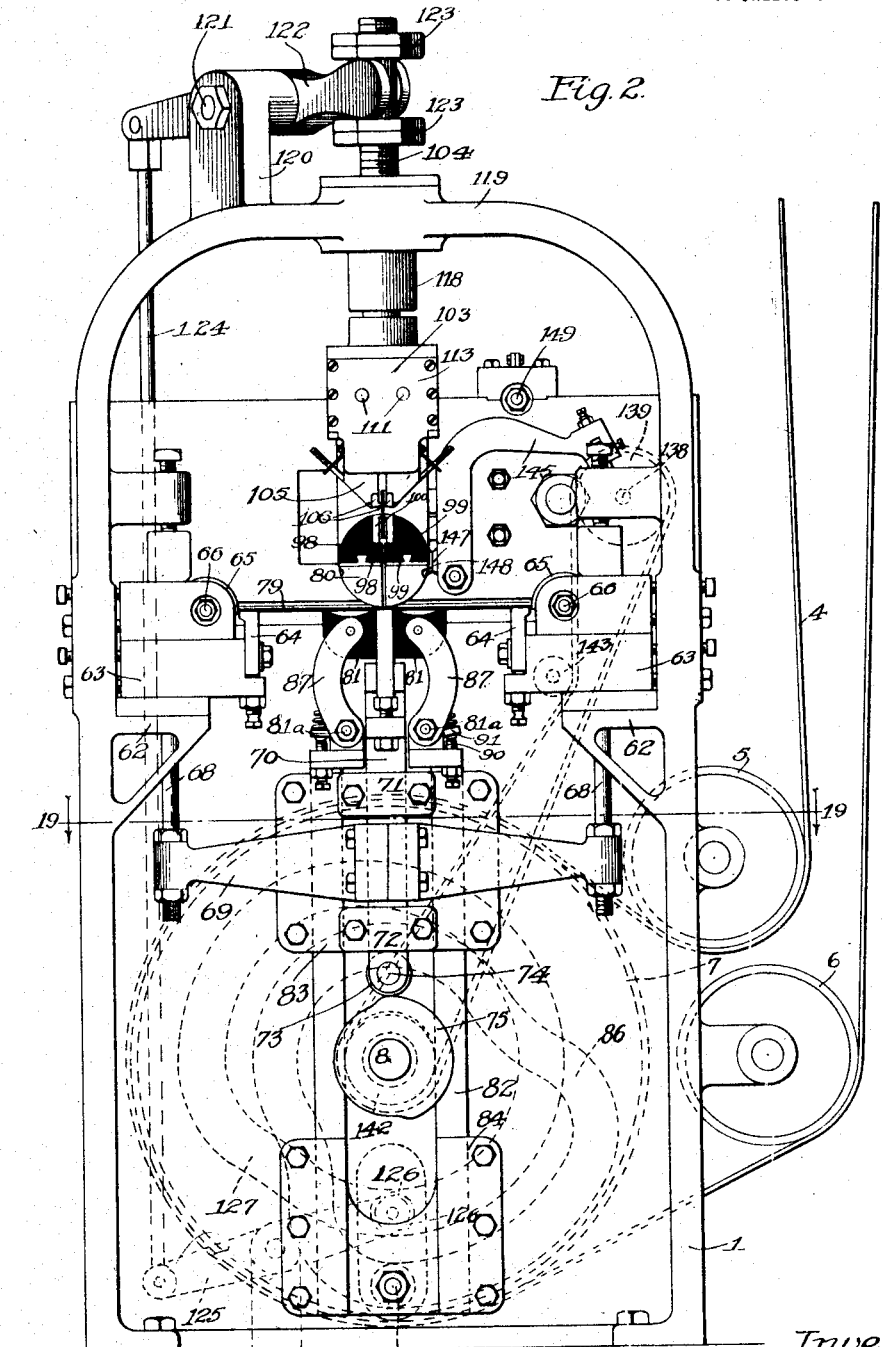

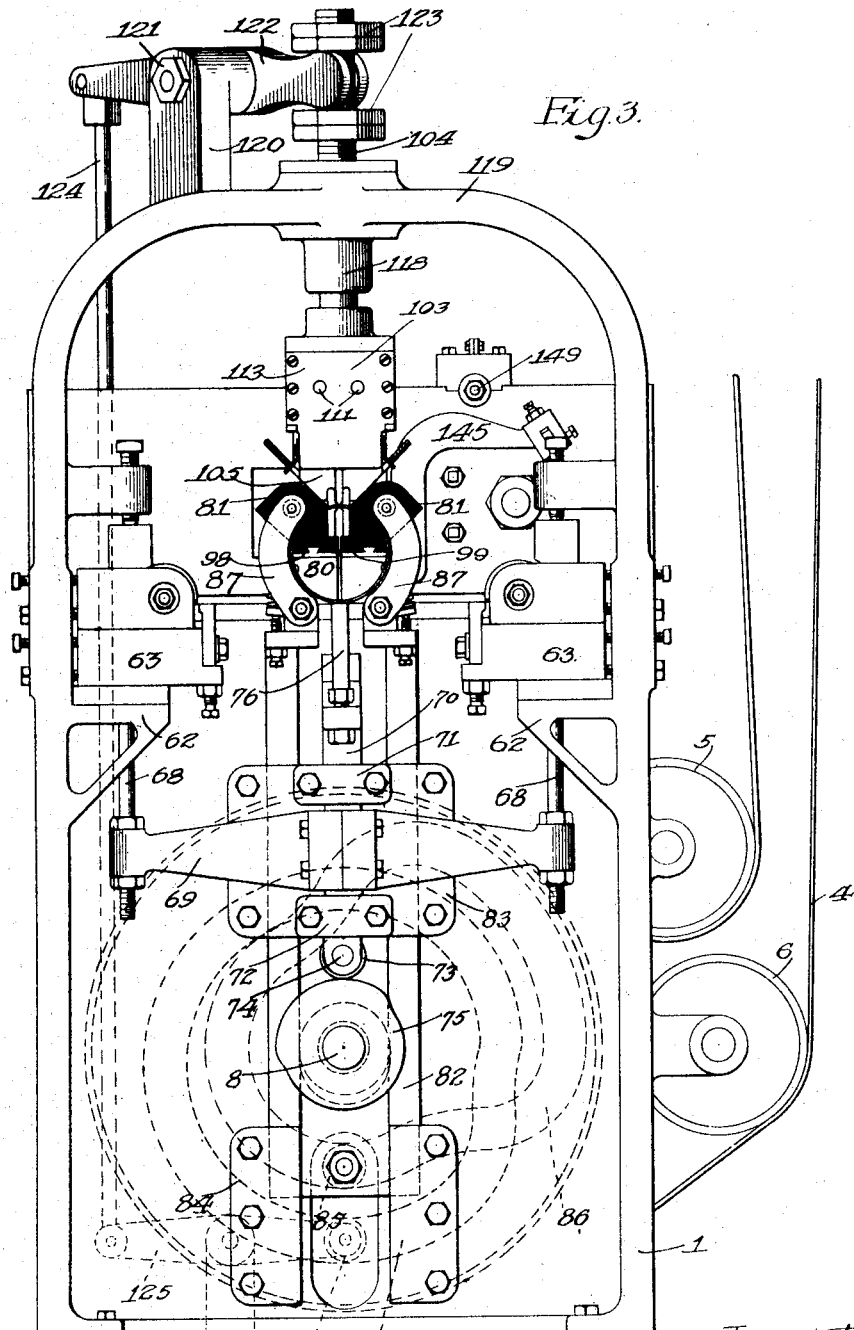

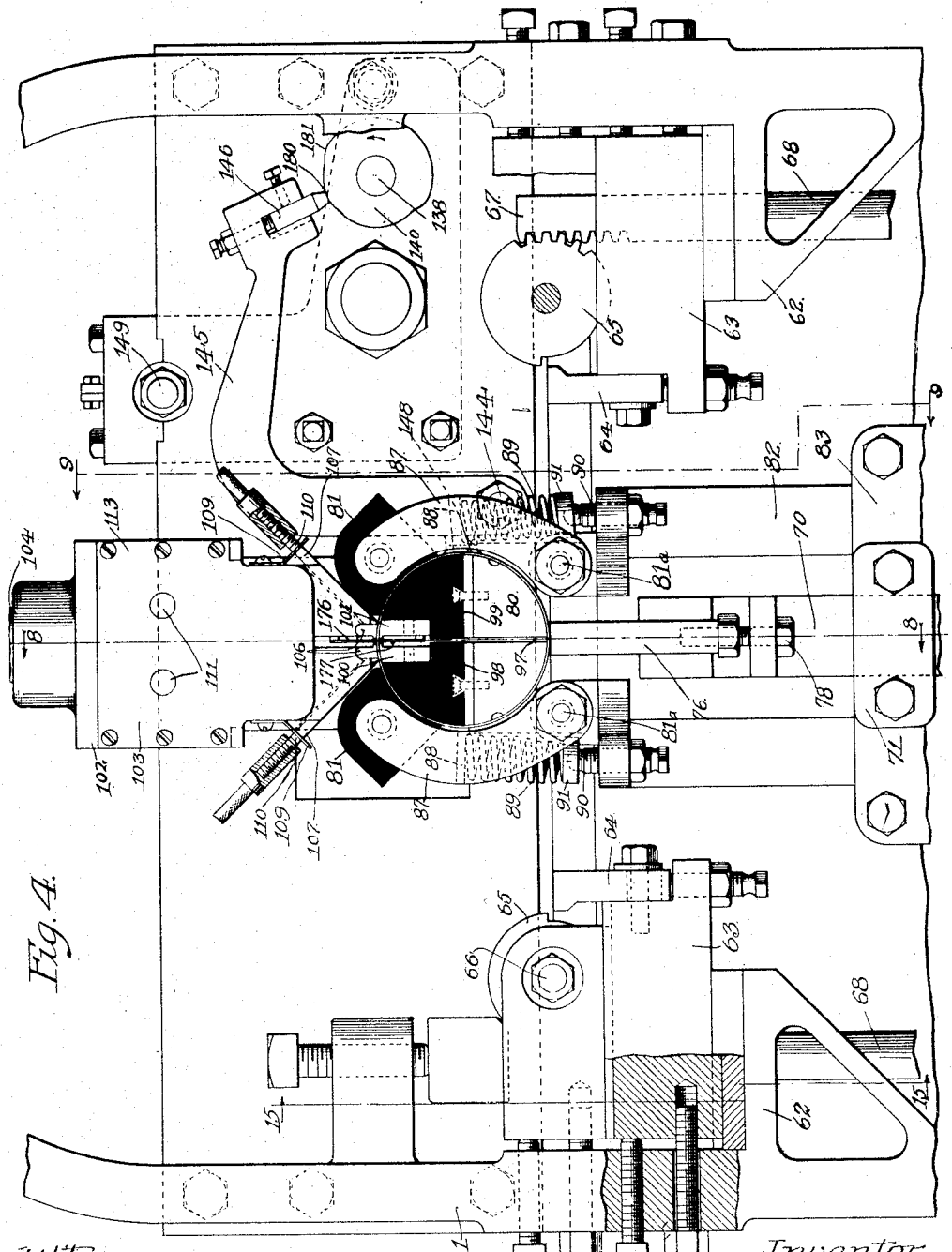

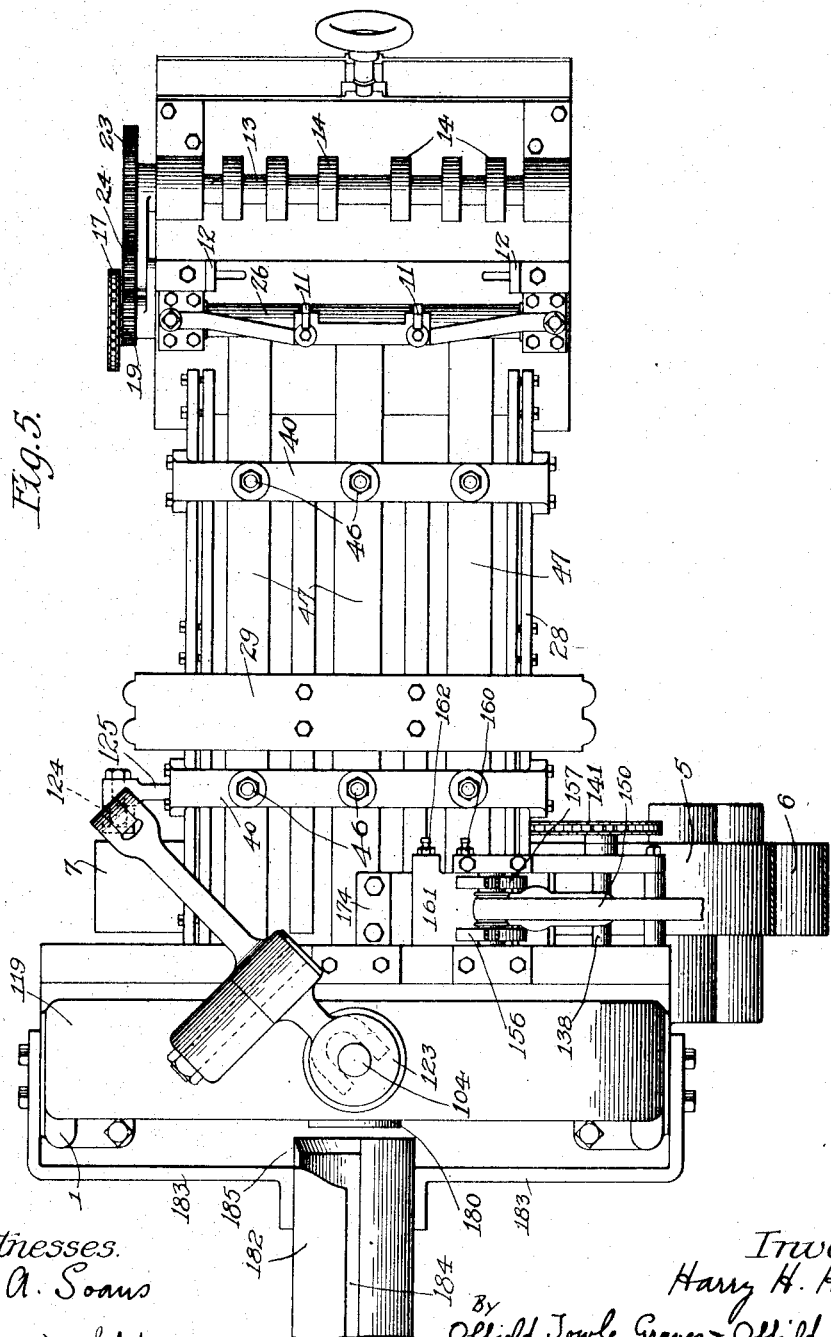

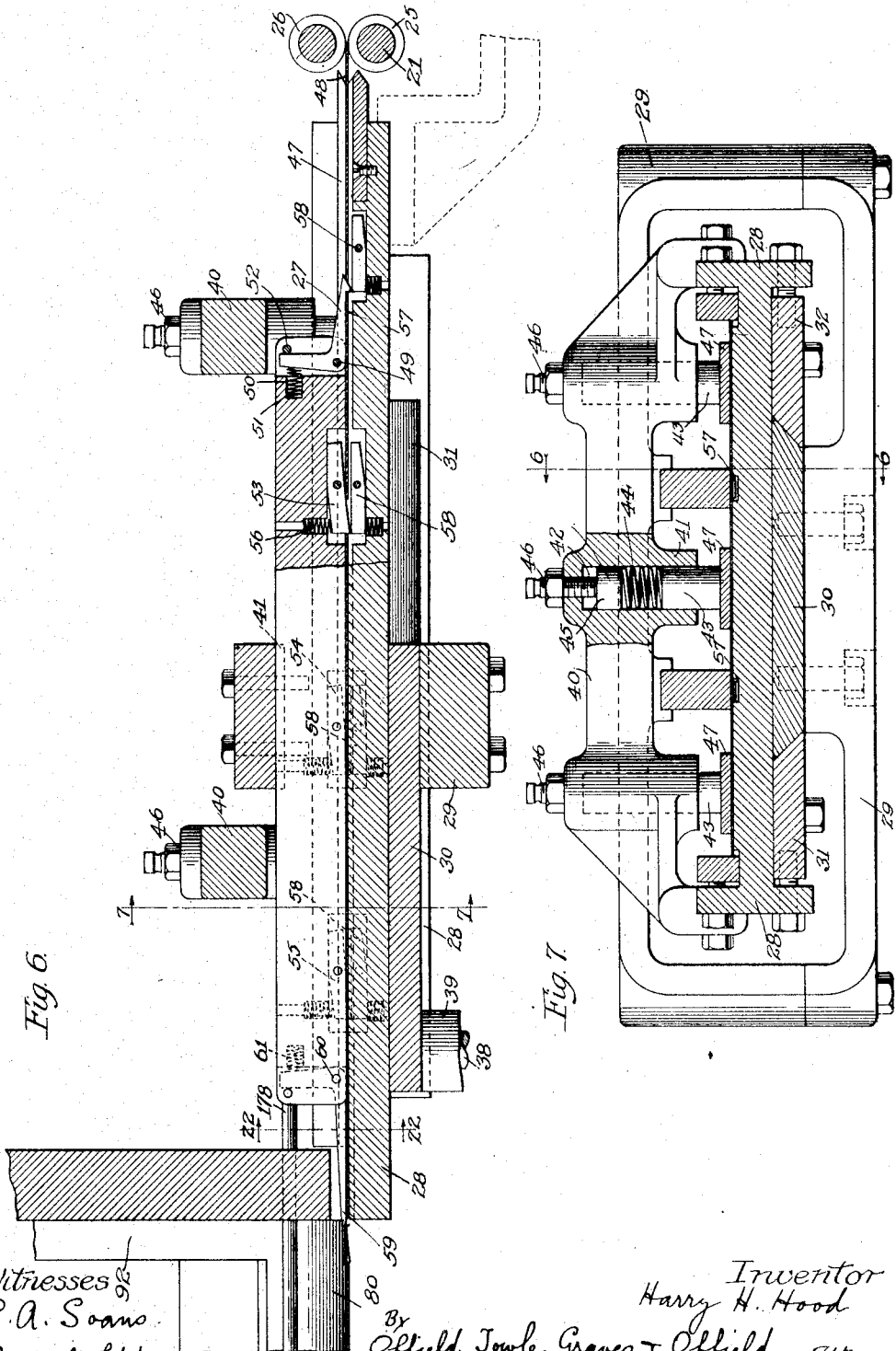

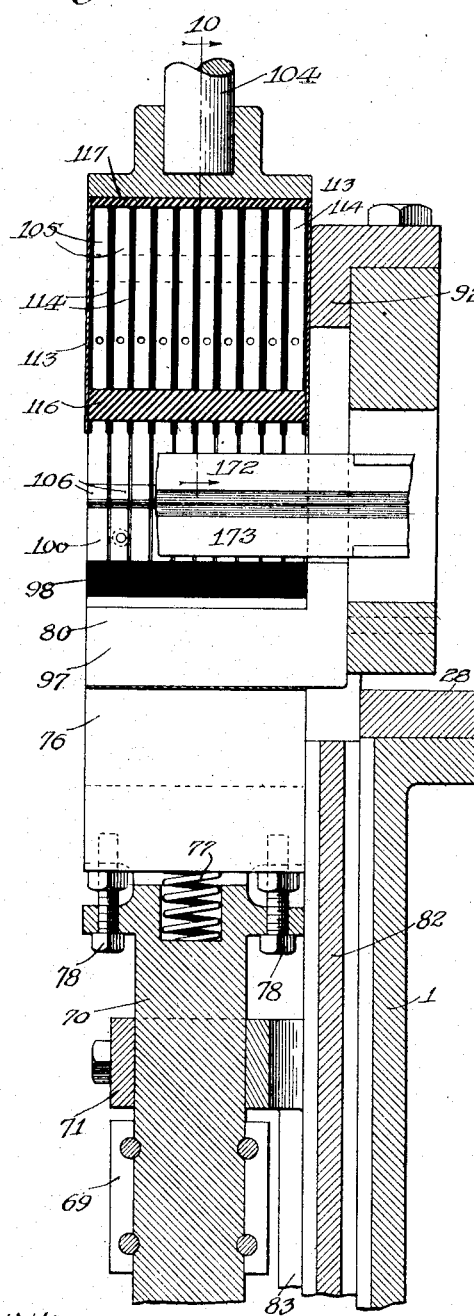

H. H. HOOD.
CAN BODY SEAM WELDING MACHINE.
APPLICATION FILED APR. 18, 1914.

1,190,902.

Patented July 11, 1916.
10 SHEETS—SHEET 8.

Witnesses.
C. A. Soans
Mary M. Leppo

Inventor
Harry H. Hood
By Offield Towle Graves & Offield Attys.

H. H. HOOD.
CAN BODY SEAM WELDING MACHINE.
APPLICATION FILED APR. 18, 1914.

1,190,902.

Patented July 11, 1916.
10 SHEETS—SHEET 9.

Witnesses
C. A. Soans
Mary M. Leppo

Inventor
Harry H. Hood
By Offield Towle Graves & Offield Attys.

H. H. HOOD.
CAN BODY SEAM WELDING MACHINE.
APPLICATION FILED APR. 18, 1914.
1,190,902.
Patented July 11, 1916.
10 SHEETS—SHEET 10.
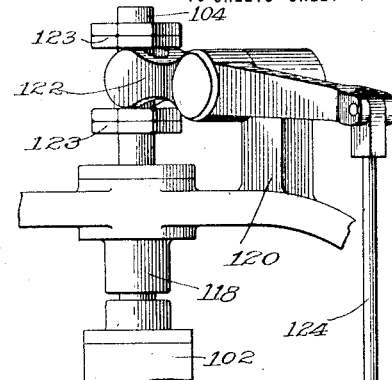
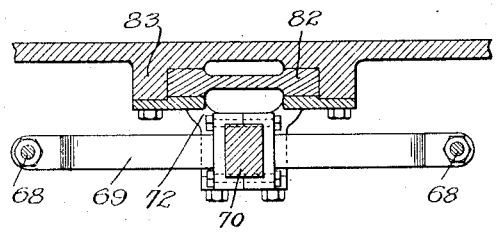
Fig. 19.
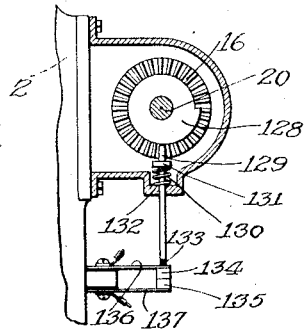
Fig. 21.
Fig. 20.
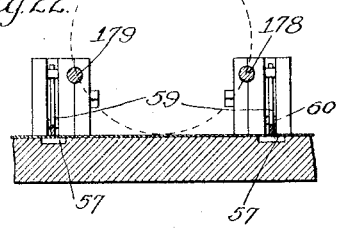
Fig. 22.
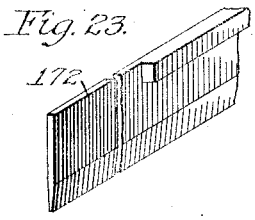
Fig. 23.
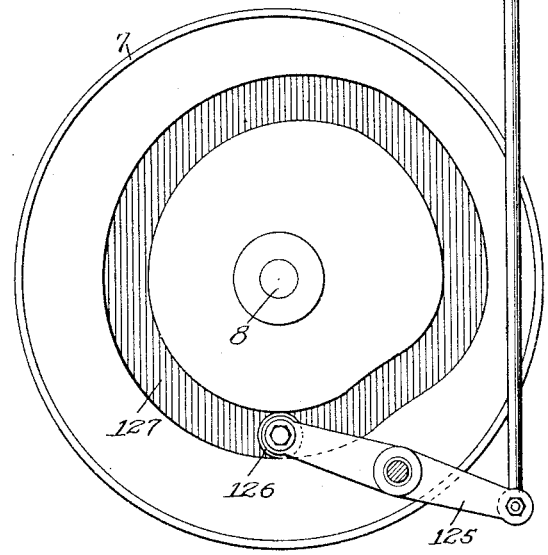
Witnesses
C. A. Soans
Mary M. Leppo
Inventor
Harry H. Hood
By Offield Towle Graves & Offield Attys.

UNITED STATES PATENT OFFICE.

HARRY H. HOOD, OF CHICAGO, ILLINOIS, ASSIGNOR TO E. F. HERRMANN.

CAN-BODY-SEAM-WELDING MACHINE.

1,190,902.      Specification of Letters Patent.      Patented July 11, 1916.

Application filed April 18, 1914. Serial No. 832,720.

*To all whom it may concern:*

Be it known that I, HARRY H. HOOD, a citizen of the United States, residing in the city of Chicago, in the county of Cook and State of Illinois, have invented certain new and useful Improvements in Can-Body-Seam-Welding Machines, of which the following is a specification.

My invention relates to improvements in can body seam welding machines and refers more particularly to machines for automatically forming the bodies and welding the seams of ordinary cylindrical tin cans.

Until recent years the ordinary cylindrical tin cans of commerce used for packing and preserving fruits, meats, vegetables, etc., were constructed with all of the seams sealed by means of ordinary solder. Of recent years, however, owing to the difficulty experienced in securing a perfect soldering of the seams of the cans, resulting in the formation of openings or pin holes, causing a large percentage of loss of the cans and spoiling of the contents in a considerable percentage of the total number of cans filled, there has been introduced the so-called sanitary can, the top and bottom caps of which are sealed by coating the meeting edges with a sealing compound and then heading the cap and body together in a rotary crimping machine. Heretofore, however, it has always been customary to make the longitudinal seam in the cylindrical can body by either making a solder-lapped joint at the seam of the can or by having the meeting edges of the seam suitably interlocked one with the other and sealed by means of a sealing compound. With either of these constructions, when the can-heads are put on by crimping the heads to the can bodies and sealing with the sealing compound, the difficulty has been to properly crimp and seal the cans at the places where the metal forms a step of double thickness caused by the overlapping of the meeting edges of the longitudinal seam of the can body. Practically the only way of avoiding this difficulty is to form the longitudinal seam of the can with a butt joint, thus doing away with those stepped portions of double thickness, but, so far as I am aware, no one prior to my invention has succeeded in making a longitudinal butt seam joint which has been mechanically strong enough to withstand the mechanical abuse to which the can is subjected both in the heading operations and in the ordinary rough handling encountered before the can reaches the consumer. Owing to the extremely thin metal used in constructing ordinary tin cans, there are presented a number of difficult problems which are not encountered in the welding of the butt seams of comparatively thick pipes or tubes, and none of the ordinary pipe-welding processes and mechanisms have proved adaptable to the welding of can bodies.

The principal object, then, of my invention is to provide an automatic machine adapted to receive a supply of tin can body blanks, to form the blanks into cylindrical or prismatic can body shapes having longitudinal butt seams, to weld the seams longitudinally and deliver the completed can bodies from the machine after the seams are welded. When using the word "prismatic," I use it in its broader sense so as to include all shapes having a uniform cross-section throughout their length, whether the shape be circular, oval, or polygonal.

Other salient objects of my invention are, to provide a construction in which the butt edges of the seam in the can are brought together, electrically heated to a welding temperature, and then suitably formed and leveled off by means of a pair of opposed hammer members operating from the inside and from the outside of the can body; to provide a construction in which the longitudinal seam is furnished with a plurality of independent welding circuits, each circuit having its own contact devices adapted to weld a certain portion of the length of the seam; to provide a construction in which each blank, before it is folded over the forming horn, is first centered and firmly held in contact with the horn, after which the sides of the blank are trimmed by a pair of shearing members, each located the same distance from the center of the forming horn, and then the blank is folded over the horn into a cylindrical shape so as to bring the sheared butt edges of the seam into proper register both with each other and with the welding electrodes; to provide a construction in which an improved form of mechanism is utilized to fold the blank over the horn; to provide a construction in which the shoes of the welding electrodes will set themselves accurately and positively and in proper registration with the edges of the longitudinal seam; to provide a construction in which the forming horn is made collapsible to permit a gradual contraction in the circumference of the can body while its butt edges are being welded together, and in order to permit the ejection of the completed can body after the welding operation is completed; to provide a construction in which the electrodes and shoes thereof controlling the several sections of the seam are each independently yieldable so as to effect proper contact with the metal of the can body; to provide a construction in which the portion of the forming horn adjacent to the electrodes is made wholly or in part of insulating material in order to prevent the short-circuiting of the blank in the vicinity of the seam, and to insulate the anvils on which the edges rest while being heated and in order to prevent cross-currents between adjacent electrodes; to provide a construction in which the folder blocks are made wholly or in part of insulated material in order to prevent cross-currents between adjacent electrodes or the short-circuiting of the blank; to provide suitable contact mechanism which will close or open the welding circuits at proper intervals in the operation of the machine; to provide a construction in which the welded can body is positively retained in cylindrical form until the weld has cooled; to provide a machine in which all of the coöperating mechanisms are properly synchronized and timed in relation to each other so that each will effect its purpose at the proper step in the complete cycle of operations of the machine; to provide an automatic machine which will be simple and substantial in design and economical in construction and operation, and, in general, to provide an improved machine of the character referred to.

My invention consists in the matters hereinafter described and more particularly pointed out in connection with the accompanying drawings, in which—

Figure 11:
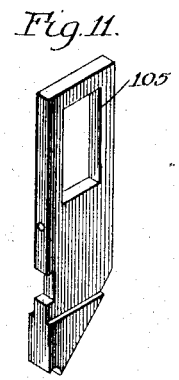
Figure 13:
Figure 12:
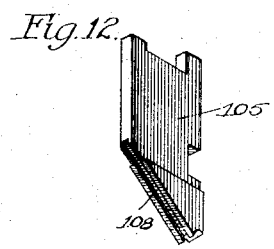
Figure 14:
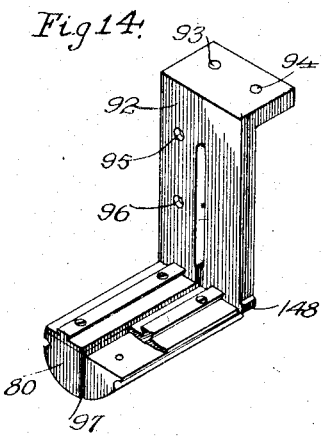
Figure 15:
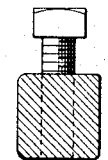
Figure 24:
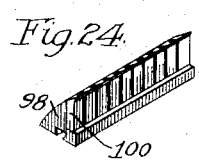
Figure 16:
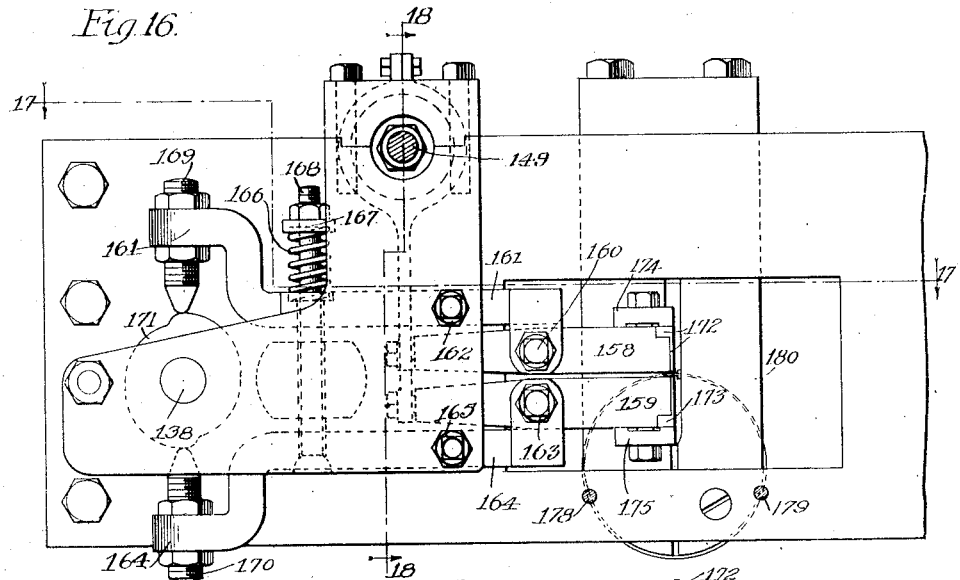
Figure 17:
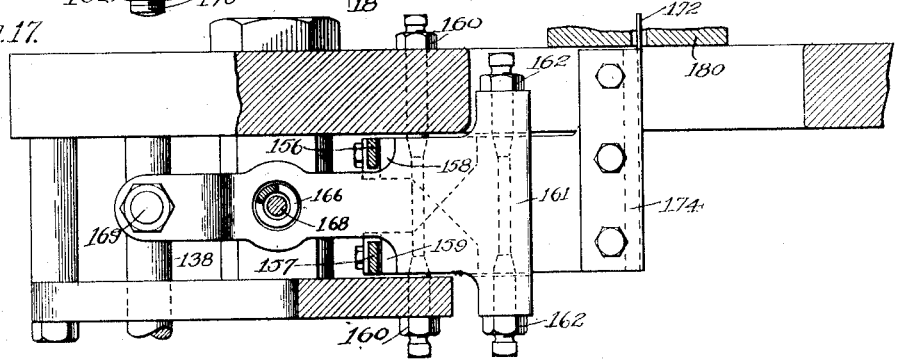
Figure 18:
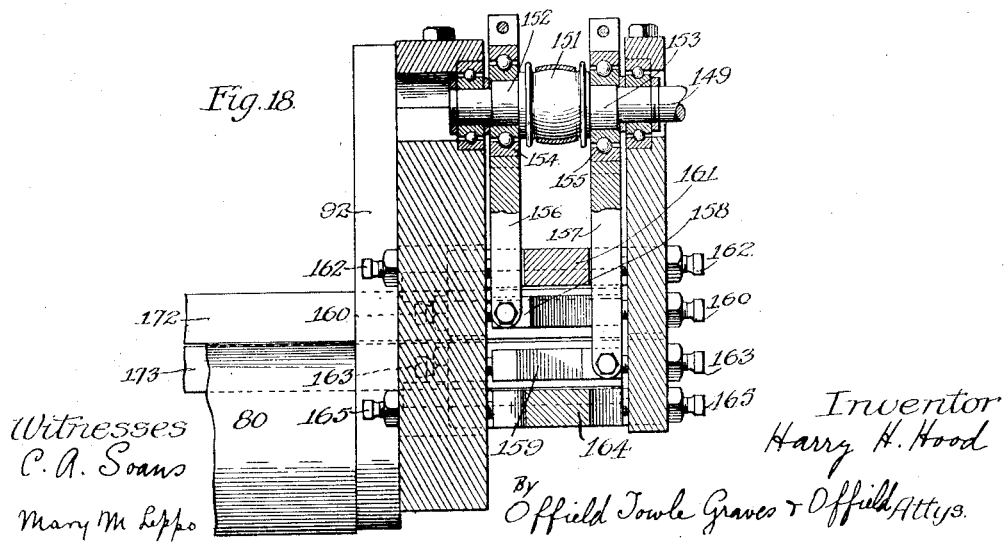

Figure 1 is an elevation of the complete machine, certain portions at the extreme right and left being broken off or not shown in order to come within the limits of the drawing; Fig. 2 is a side view of Fig. 1, looking from the left, showing the machine in readiness to form and weld one of the blanks; Fig. 3 is a view similar to Fig. 2, but in this case the blank has been folded and the welding head brought down in contact with the edges of the longitudinal seam; Fig. 4 is an enlarged view of the central portion of Fig. 3; Fig. 5 is a plan view of the complete machine; Fig. 6 is a longitudinal section through the blank-feeding slide and bed taken on line 6—6 of Fig. 7; Fig. 7 is a section through the blank-feeding slide and bed taken along the line 7—7 of Fig. 6; Fig. 8 is a longitudinal section taken along the line 8—8 of Fig. 4; Fig. 9 is a section similar to Fig. 8 taken along the line 9—9 of Fig. 4; Fig. 10 is a section along the line 10—10 of Fig. 8; Figs. 11 and 12 are perspective views of one of the welding electrodes; Fig. 13 is a perspective view of one of the welding electrode shoes; Fig. 14 is a perspective view of the forming horn, the upper portion thereof being removed; Fig. 15 is a section taken along the line 15—15 of Fig. 4; Fig. 16 is a view showing the vibratory hammer mechanism; Fig. 17 is a sectional plan view taken along the line 17—17 of Fig. 16; Fig. 18 is a vertical section along the line 18—18 of Fig. 16; Fig. 19 is a section along the line 19—19 of Fig. 2; Fig. 20 shows the mechanism for lowering the welding head into contact with a can body; Fig. 21 is a detail view of the contact device; Fig. 22 is a sectional view taken along the line 22—22 of Fig. 6; Fig. 23 is a perspective view of one of the hammer blades; and Fig. 24 is a perspective view of the left-hand upper quadrant of the forming horn.

Referring to the drawings, it will be seen that the mechanisms for performing the various operations of the machine are mounted upon a front frame 1 and a back frame 2, both of which are connected by a cast-iron base-plate 3. Power for operating the machine is supplied by means of a belt 4 which passes over a pair of idler pulleys 5 and 6 journaled at the side of the front frame 1 of the machine and drives a large belt pulley 7 which is keyed to a shaft 8 which drives the principal mechanisms of the machine.

*The blank feeding mechanism.*—As a whole 9 represents a mechanism well known to those skilled in the art, for feeding the blanks, one at a time, to the machine.

10 represents the blanks which are disposed in a vertical stack bounded by the adjustable vertical guides 11, 11 and 12, 12. The shaft 13 below the stack of blanks is furnished with a roller 14, the surface of which in an axial line along its periphery is cut to form a stepped edge slightly less in elevation than the thickness of a blank, this edge engaging the end of the bottom blank of the stack as the roller 14 revolves. The shaft 13 is synchronized with and driven by means of a train of gearing comprising bevel wheels 15 and 16, chain 17, engaging sprockets 18 and 19 on the shafts 20 and 21, and gears 22 and 23 which are connected by the intermediate gear 24. On the shaft 19 is a horizontal roller 25 extending across the machine which coöperates with a companion roll 26 journaled directly above it. Each of these rolls 25 and 26 is grooved at two zones in its length so as to admit one of the blank-advancing claws 27, as shown at the right of Fig. 6.

Referring to Figs. 1 to 5, 6 and 7, it will be seen that the two main frame casings 1 and 2 are connected by a bed or casing 28, the under side of which is machined out to form a bearing slide for the blank-feeding carriage designated as a whole 29. The lower part of this carriage 29 is furnished with a dove-tail shoe 30 which slides within the dove-tail slot formed by the under side of the machined surface of the casing 28 and the adjustable guides 31 and 32 secured to the under side of said member 28. The carriage 29 is reciprocated in synchronism with the machine by means of a train of mechanism comprising bevel gear 33 secured to shaft 8, bevel gear 34 keyed to a vertical shaft journaled in the back frame 2, the upper end of the shaft being provided with a crank-disk 35. At a suitable point in the crank-disk 35 is located crank-pin 36 which coöperates with an adjustable connecting rod 37 engaging the pin 38 seated in the downwardly extending boss 39, which is an integral part of the carriage 29. Extending horizontally across the fixed bed 28 and bolted thereto are a pair of cross-bridge members 40, 40 in each of which are a series of three large integral bosses 41, each of which is provided with a cylindrical bore 42 open at its lower end to admit the presser plunger 43. Each of these presser plungers 43 is forced downwardly by means of a spring 44 interposed between the upper end of the plunger and a thick washer 45 in the upper part of the bore 42, the compression of the spring being adjusted by means of the screw 46. The presser plungers in the two bridge members 40, 40 are connected to and operate upon three longitudinal pressers 47 which extend the entire length of the bed and hold the blank down into proper contact therewith. At the rear of the machine where the blank enters between the pressers and the fixed bed 28, the ends of the pressers and of the bed are beveled off, as shown at 48 in Fig. 6.

Describing now the operation of the reciprocatory carriage 29, the rear end thereof is furnished with bell-crank claws 27, previously referred to, which are journaled upon a cross-pivot 49 and forced downwardly by means of springs 50 seated in recesses 51 and coöperating with the upper ends of the vertical arms of the bell-cranks. The downward movement of the bell-cranks is limited by a cross-rod 52. Suitably spaced in the length of the carriage 29 are three sets of advancing dogs 53, 54, 55, each of said advancing dogs comprising a horizontally pivoted lever, the front end of which is pressed downwardly by a spring 56 seated in a hole drilled in the carriage. The downward movement of the end of each of the advance dogs is limited by the upper end of the lever striking the top of the slot in which each lever is located. In order to prevent the ends of the claws 27 and advance dogs from scraping over the surface of the bed 28, the latter is milled out longitudinally its entire length, as shown at 57. In order to prevent any possibility of the blanks losing their positions owing to the drag of the claws 27 or advance dogs 53, 54, 55, four sets of retaining pawls 58 are located in the upper part of the bed member 28, in order to engage the rear end of the blank and prevent a backward movement.

Describing now the operation of the blank-feeding carriage, each blank, as it is slid from beneath the stack by the blank-feeding mechanism 9, is engaged by the rollers 25 and 26 and enters between the beveled edges 48 of the bed 28 and pressers 47. While the rollers 25 and 26 have been advancing the blank, the carriage has been moving to the rear, and, after the blank has reached the limit of its forward movement beyond the further influence of the rollers, the claws 27 enter the grooves in the rollers, previously referred to, and the latches drop behind the rear edge of the blank. The blank is then carried forward one step by the forward reciprocation of the carriage. It is then advanced another step by means of the set of advance dogs 53 which push it forward in a similar manner, and third and fourth steps by the advance dogs 54 and 55. It is finally advanced into the body-forming mechanism by the bell-crank dog levers 59, which are pivoted upon a cross-rod 60 in the front end of the carriage and forced downwardly by means of springs 61, these levers 59 operating in a similar manner to that of the advance dogs 53, 54 and 55.

*The blank-trimming and centering mechanism.*—Referring to Figs. 2, 3, 4, 15 and 19, it will be seen that the front frame 1 of the machine is constructed with a pair of opposed inwardly projecting brackets 62 upon which rest the adjustable slides 63, to the inner edges of which are secured a pair of upstanding steel shearing dies 64. These shearing dies 64 have longitudinal cutting edges along their outer edges, and the slides 63 are adjusted inwardly or outwardly toward the center of the machine so as to bring these two cutting edges precisely at the same distance from the center of the apparatus and a suitable distance apart to cut the blank of the proper length for the can body being constructed. The upper portions of these slides 63 also carry a pair of rotary shearing knives 65, these also being adjustable inwardly and outwardly toward the center of the machine so as to effect proper coöperation with the edges of the shearing dies 64. These rotary shearing knives 65 are journaled upon pivots 66, and in a portion of the circumference of the knives opposite the cutting edges are furnished with gear-teeth which are engaged by vertical upstanding rack members 67. These rack members 67 slide in suitable guides provided for them at the side of the machine, and are reciprocated by a pair of rods 68 which are adjustably secured in the cross-head 69. The cross-head 69 is formed in two pieces securely clamped upon the vertical rectangular cam rod 70 which slides in a pair of central guides 71 and 72 mounted on the front frame of the machine. The lower end of this cam rod 70 is slotted to admit the cam roller 73, which is journaled upon a pin 74 seated in the lower end of the rod 70. The cam roller 73 rolls upon and is engaged by a cam 75 secured to the projecting end of the shaft 8. The upper end of the cam rod 70 is slotted longitudinally in order to furnish a slide for the centering presser plunger 76 which comprises a flat rectangular piece of steel, long enough longitudinally to engage the entire length of the can body. The presser plunger 76 is normally forced upward by a strong coil spring 77 seated in a longitudinal bore at the upper end of the cam rod 70, its upward movement being limited by a pair of adjustable headed studs 78 sliding in holes formed in lugs integral with the end of the cam rod.

When the blank 79 has been advanced by the blank-feeding mechanism previously described, it occupies the position shown in Fig. 2 and is directly beneath the forming horn 80, its outer edges supported by the shearing dies 64. After the blank has been pushed into this position, the cam 75 as it revolves engages the roller 73 and the rod 70 rises. The effect of this is to push the plunger 76 upward, clamping the blank securely between the plunger and the forming horn along a longitudinal line in the center of the blank and diametrically opposite to the point where the seam is to be formed at the upper surface of the forming horn. The cutting knives 65 are so formed that, although they commence to revolve at substantially the same moment that the plunger commences to rise, they do not operate to trim the edges of the blank until the latter has been securely clamped into contact with the forming horn.

*The can body folding mechanism.*—After the blank has been centered under the horn and its edges trimmed by the rotary shearing knives, the folding mechanism comes into play. The folding of the blank is accomplished by means of a pair of folder blocks 81. These blocks are of substantially the same length as the can body, and, as will be seen from an inspection of Figs. 2, 3 and 4, have grooved surfaces adapted to fit the circumference of the can. Each of these blocks is pivotally mounted at the upper end of one of a pair of links 87 located on each side of the center line of the machine. These links are pivoted upon pins 81ª at their lower ends to the top of the reciprocatory slide 82, which is vertically mounted in guide channels 83 and 84 formed in the front of the main frame 1 of the machine. On the lower end of the slide 82 is mounted a pin 85 carrying a cam roll cooperating with a cam track 86 formed in the front side of the body of the main drive pulley 7. This cam track is so formed as to move the slide member 82 upwardly at the proper step in the operation of the machine. The lower portions of the links 87 are enlarged and provided with spring pockets, the upper ends 88 of which are engaged by compression coil springs 89 mounted upon adjustable screw studs 90 located to the outside of the link pivots and seated in lugs projecting from the sides of the slide member 82. The ends of these studs 90 are made spherical so as to engage corresponding spherical recesses in the under sides of washers 91 upon which the springs 89 are mounted, in order to allow for a considerable angular variation in their positions as the blank is being formed. It will be noticed that before the folding blocks are moved upwardly to form the blank, the action of the springs is such that the blocks tightly clasp the presser plunger 76. As soon as the cam 86 commences to move the slide member 82 upwardly, the blocks are pushed into engagement with the blank and pivot about their inner edges until the grooved surfaces of the blocks are firmly clamped upon the under side of the blank and around the forming horn. Then, as the slide continues its upward movement, the blocks leave the bottom of the horn and slide around on either side of the can body until they occupy the position shown in Fig. 4. It will be noticed that at all times, owing to the fact that the link pivots are considerably closer together than the center lines of the springs, the action of the latter is such as to cause the blocks to be pushed toward each other quite strongly, and so the upper edges of the blank are at all times tightly pressed toward each other while the forming blocks are in their uppermost position. The blocks 81 are constructed wholly or in part of reinforced bakelite in order to prevent short circuiting of the welding electrodes.

*The welding mechanism.*—Referring to Fig. 14, it will be noticed that the forming horn projects from the lower end of an integral bracket member 92, which is secured to the front frame of the machine by means of four bolts passing through apertures 93, 94, 95 and 96 in the top and one side of the front of the bracket. This integral member forming the lower part of the horn and the bracket is split by a longitudinally axial slot 97 which is extended upward into the vertical portion of the bracket for a considerable distance, and it will be seen that the holes of 95 and 96 are located upon one side only of said slot. The purpose of this construction is to give a certain amount of resiliency to the forming horn for a purpose which will hereinafter appear. The upper portion of the forming horn is made in two sections 98 and 99, as shown in Fig. 4, each section occupying substantially a quadrant of the entire circle and being formed of bakelite or other suitable insulating material in order to prevent short circuiting of the welding electrodes. The adjacent upper edges of these quadrant sections 98 and 99 are shod with steel anvil members 100 and 101, which may be replaced when worn out. These anvil members 100 and 101 are divided into a number of insulated sections, corresponding to the number of sections of the welding electrodes, as shown in Fig. 24.

In order to prevent the flow of current from being monopolized by certain portions of the seam being welded while other portions of the seam are insufficiently supplied with current, the welding circuit is divided into a plurality of independent sections, each of which receives its supply of current from an independent source which can be separately adjusted to furnish the required supply of current for each particular section of the seam. Preferably this independent current supply is taken care of by winding a plurality of secondary circuits upon the core of a welding transformer having a common primary, each secondary coil leading to one terminal of each welding section. The current in each section may be readily adjusted to the proper amount by changing the number of turns in the secondary winding controlling that section.

Referring to Figs. 8, 9 and 10, it will be seen that the welding electrodes are mounted within a channel-shaped casting 103 secured to the lower end of a plunger 104. In this embodiment I have indicated a welding head having ten independent pairs of electrodes mounted thereon. Each electrode comprises a main body portion 105, which is grooved out at its lower end to receive the upper edge of the welding shoe 106, the latter being provided with an outwardly extending current-conducting terminal rod 107 which is located in a slot 108 formed in the inclined outer edge of the electrode 105. The outer end of the current-conducting rod 107 passes loosely through the end of a slot in the small angular bracket 109 screwed to the vertical outer edge of the electrode, the shoe being prevented from slipping downward by means of a small nut 110 threaded upon the upper end of the rod. It will be noticed that the groove at the point of the electrode is circular in shape so as to permit a slight pivotal or rocking movement of the shoe 106 when the electrodes are moved down into contact with the can body. The slot in the end of the bracket 109 is of sufficient length to permit the rod 107 to swing in toward the electrode as the shoe seats itself on the can. Each set of ten electrodes is clamped together by means of a longitudinal rivet 111 insulated from the electrodes by rectangular insulators 112, the ends of the rivets being headed over upon clamping plates 113 secured by screws to each end of the welding head. The fit of the rivets 111 and of the rectangular insulating plates 112 is such as to permit a slight endwise individual movement of the electrodes. Adjacent electrodes are separated electrically by insulating plates of bakelite or other suitable material, as shown at 114 in Fig. 8, and each electrode is prevented from making contact with the side of the casting 103 by virtue of a small insulating pin 115 driven into the outer edge of the electrode and bearing against the side of the casting. The lower ends of each bunch of electrodes are kept apart by a longitudinal rod of soft rubber 116, rectangular in section, and seated in a pair of opposed grooves extending the entire length of each bank of electrodes. The two banks of electrodes are insulated from the casting 103 at their upper ends by a flat plate of semi-hard rubber 117 which, besides being an insulator, forms a cushion which gives a considerable amount of yield and resiliency to the electrodes, and thus causes them to seat themselves properly on the surface of the can body.

The welding head 102 carrying the electrodes is raised and lowered into and out of contact with the edges of the can seam by means of the following mechanism: The vertical rod 104, to which the casting 103 is secured, is vertically slidable in a central boss 118 carried by the bridge-arm 119 springing from the sides of the main frame casting 1. Upon the top of this bridge-arm 119 and to the left of the center of the machine is carried an upstanding bracket 120, in a projecting boss of which is secured a pivot pin 121. Upon this pivot pin 121 is rotatably mounted a double-ended forked lever 122, the large end of which spans the upper end of the rod 104, which projects from the upper end of the machine. This upper end of the projecting rod 104 is threaded and furnished with two pairs of adjustable threaded collars 123 which engage the upper and lower sides of the large forked end of the lever 122. The other end of this lever 122 is also forked and pivotally connected to the rod 124 which extends down to the lower part of the machine and is itself pivotally connected to the outer end of a horizontally pivoted lever 125, see Fig. 20. The other end of this lever 125 is equipped with a cam roll 126 rotatably mounted thereon, which is engaged by a cam track 127 formed in the rear face of the main drive pulley 7. The cam track 127 is so shaped as to cause the welding head to be lowered and raised at proper intervals in the operation of the machine. The collars 123 are properly adjusted to give the required amount of movement to the welding head necessary in order to seat the electrodes firmly in contact with the can surface, and the cam track 127 is so organized as to effect a dwell in the movement of the head of a sufficient duration to form the weld. In order to prevent arcing at the points of the electrode shoes, the current is cut off by an independent contact device before the electrodes are raised out of contact. This contact device is arranged in connection with the shaft 20 and is properly synchronized with the welding head movement so as to break the contact at the proper moment. This contact device I have indicated in Fig. 21 of the drawings as comprising a cam 128 which has a gradual rise and an abrupt fall, so that the plunger 129 will snap upward and break the contact instantaneously. The plunger 129 is forced into engagement with the surface of the cam 128 by means of a spring 130 interposed between an integral collar 131 fixed to the upper end of the plunger and the bracket 132 in which the plunger slides. The lower end of the plunger 129 is insulated, as indicated at 133, and closes contacts 134 and 135 in its downward movement. Springs 136 and 137 carrying the contacts are adjusted to spring apart when the plunger snaps upward, and are connected to the primary circuit of the transformer supplying the welding current. It is understood that the contact arrangement just described is more or less diagrammatic and any suitable switching mechanism may be employed which effects the same result, as may be readily understood by those skilled in the art.

I will now describe the mechanism which I employ for forcing together the abutting edges of the seam during the welding operation: Mounted in a pair of suitable journal bearings projecting inwardly from the right-hand side of the main frame casting 1 is a shaft 138 which carries a sprocket wheel 139 and a rotary cam 140. The shaft 138 is positively driven by a chain 141 which is trained around the sprocket wheel 139 and another sprocket wheel 142 keyed to the main shaft 8 of the machine. Interference of the chain with other mechanical parts of the machine is prevented by an idler sprocket 143. Slightly to the right of the horn and below the center line thereof there is located in the frame of the machine a pivot pin 144, and upon this pin is pivoted the angular lever 145, the outer end of which carries an adjustable cam point 146 which coöperates with the surface of the cam 140.

Upon the inner side of the vertical arm of the cam lever 145 is formed a projection 147, as shown most clearly in Fig. 2, this projection registering with a projection 148 upon the lower end of the split bracket carrying the bottom of the horn, as shown in Fig. 14. The projection 147 is relatively close to the pivot 144, so that a relatively large movement of the outer end of the cam lever will cause a much smaller horizontal movement of the projection 147, and thus squeeze together the lower split portions of the horn with great power. As previously described, the forming blocks 81 are arranged to be attracted together by means of the springs 89, and thus tend to force together the meeting edges of the seam of the can body, and thus, when the horn is contracted by virtue of the cam 140 operating in conjunction with the lever 145, the edges of the seam close up. While the two opposed edges of the can seam are being pushed together as just described, the electrode shoes do not slide upon the can but also approach each other, this inward movement of the electrodes being permitted by means of the rectangular rubber spacing rod 116, which is thereby squeezed together slightly as the electrodes advance toward each other. The switching mechanism, lowering of the welding head, and the horn-contracting mechanism just described, are so arranged and timed as to force together the abutting edges of the can seam at the precise moment when the weld is being formed.

*The hammer mechanism.*—I have discovered that in order to obtain a seam having a properly finished surface, and also in order to effect a perfect weld, it is necessary to press or hammer the welded seam while it is still hot and thus form a smooth level surface, free from burs or imperfections, and in order to effect this hammering I employ the mechanism which I shall now describe.

Referring to Figs. 1, 2 and 4, 149 indicates a short longitudinal shaft journaled on ball bearings in the upper portion of the main frame of the machine. This shaft is driven at an exceedingly high speed by means of a belt 150 passing around a small belt pulley 151 keyed thereon.

Referring now to Figs. 16, 17 and 18, I have shown on either side of the pulley 151 and securely keyed to the shaft 149, eccentrics 152 and 153. These eccentrics have a comparatively small throw and the centers thereof are placed diametrically opposite each other across the axis of the shaft. Arranged to coöperate with these eccentrics are a pair of ball-bearing eccentric straps 154 and 155, the lower ends of which terminate in comparatively thin resilient flat rods 156 and 157 which are pivotally connected to a pair of flat cross levers 158 and 159. The upper lever 158 is pivoted between a pair of cone-shaped pivot screws 160 seated in a pair of lugs projecting downwardly from the inner end of the lever 161, which is itself pivoted between a pair of similar opposed pivot screws 162 located in the frame of the machine. The lower lever 159 is similarly pivotally mounted between a pair of opposed cone-shaped pivot screws 163, which are seated in a pair of lugs projecting upwardly from the inner end of the lower lever 164, which is itself pivotally mounted between a pair of opposed cone-shaped pivot screws 165 also fixed in the frame of the machine. The levers 161 and 164 are forced together at their outer ends by means of a spring 166 interposed between the lever 161 and a collar 167 on the end of the bolt 168, the other end of which is headed into the lower side of the lever 164. The outer ends of the upper and lower levers 161 and 164 are both bent out, as shown in Fig. 16, so as to provide space between them for the adjustable opposed cam points 169 and 170 which coöperate with the cam 171 keyed to the shaft 138 which, as previously described, is driven by the chain 141. The inner ends of the levers 158 and 159 are L-shaped, as shown in Fig. 17, and are superposed one above the other, stopping just short of the can-forming horn 80, so as to avoid interference therewith. Seated in a pair of rectangular longitudinal notches extending along the inner edges of these L-shaped levers are the shanks 172 and 173 of the two hammer blades, one of which is shown in Fig. 23. The shanks 172 and 173 of the hammer blades are securely clamped into the notches referred to by a pair of three-bolt clamps 174 and 175. As indicated in Fig. 23, the hammer blades, which are formed of hardened burnished steel, are securely welded or brazed to the shanks so as to prevent any loosening up or fracture, due to the extremely rapid vibration of the hammer levers. The hammer blades, as shown, are superposed one above the other and extend into open slots 176 and 177 formed by the adjacent edges of the two banks of electrodes and the adjacent opposed faces of the two anvil members 100 and 101. These slots should be milled out large enough to prevent improper contact of the hammers with the electrodes or the anvils. The hammers operate as follows: For the greater part of the time the hammers simply vibrate up and down idly without accomplishing any useful work, since the cam 171 is in such position as to permit the outer ends of the levers 161 and 164 to be attracted together by the spring 166, and the levers 158 and 159 are thus separated sufficiently to prevent the hammers from striking the seam. When, however, the shaft 138 revolves into proper position to bring the points 169 and 170 into the position shown in Fig. 16, the inner ends of the levers 161 and 164 are brought close together and the hammers 172 and 173 approach into contact with the seam, and thus rapidly hammer the surface thereof into a smooth level finished surface. The cam 171 is properly synchronized with the other welding mechanism so as to bring the vibratory hammers into operative contact with the weld when the required temperature is reached. It will be readily understood that the shape of the cam 171 is such that the vibratory hammers will move out of contact with the can body before the ejector mechanism comes into play.

*The ejector mechanism.*—The can is pushed off the horn when the weld is finished by a pair of longitudinal ejector rods 178 and 179 (see Figs. 6, 16 and 22) which project from the front end of the reciprocatory blank-feeding carriage 29. The ends of the ejector rods are the proper length so as not to interfere with the folding of the blank around the horn by the folder blocks 81. As will be noted from an inspection of Fig. 4, the lower part of the forming horn has milled therein a pair of longitudinal semi-circular grooves to provide paths for the ends of the ejector rods in their outward movement. It is, of course, understood that after the welding of the seam is completed the folder arms are withdrawn downwardly, the welding head is raised, and the vibratory hammers are thrown out of contact, leaving the can free on its outer surface. The can body, however, is still frictionally held by the forming horn, and before the ejector rods strike the inner end of the can, the horn must be contracted slightly. It is understood that during the preceding steps in the process the horn has been contracted slightly by the lever 145 operated upon by the cam 140 which has a slightly raised portion 180 for causing the slight contraction of the horn as the edges of the seam are brought together. The additional contraction of the forming horn to release the can after the weld is completed is accomplished by providing a cam surface 181 on the cam 140 which is raised slightly beyond the surface 180 of the cam, thus causing a slight additional inward movement of the lever 145 as the cam 140 continues to rotate. The additionally raised portion 181 of the cam 140 is of a sufficient length around the circumference of the cam to permit the ejector rods to push the can body entirely away from and off the forming horn 80 before the horn is permitted to resume its normal size.

In order to reduce the cost of manufacturing the can bodies in this machine it is desirable to run it at as high a speed as possible and, as a matter of fact, each entire cycle of operations consumes only a comparatively few seconds. It is thus necessary to eject the completed can body from the machine before the weld has properly cooled, and in order to prevent the can body from springing out into an eccentric shape while the weld is still soft, the ejected can body must be securely held around its circumference while the weld is cooling. This is taken care of by a hollow split cylinder 182 which is supported at the front of the machine axially in line with and adjacent to the end of the horn by means of a pair of brackets 183 secured to the sides of the main frame 1 of the machine. The slot 184 forming the split in the cylinder, is located at the top of the pipe so that the weld in the can body is exposed to the atmosphere on both sides and cools quickly. The inner end of the cooling pipe 182 is beveled slightly, as indicated at 185, in order to admit the can body freely, and the finished cooled can body is finally ejected from the cooling pipe by the next following can body ejected from the machine.

It is understood that all of the various mechanisms which perform the particular steps in the welding of the can body are positively synchronized with each other, so that each operation is performed in its regular order and at the right moment in the cycle.

Certain minor details of the machine which have not been described are such as an ordinary mechanic skilled in the art would be quite familiar with and need not be elaborated upon. It must also be understood that the various mechanisms shown in the drawings and described in the specification are capable of considerable modification without departing from the spirit of my invention, and, in any case, I do not limit myself to the details of construction shown except as specified in the appended claims.

I claim:

1. In an electrical seam-welding machine, the combination of means for supplying current to the parts to be welded, a vibratory hammer disposed over the top and another vibratory hammer under the bottom of the seam, and means for engaging said hammers with the seam when a welding temperature is attained.

2. In an electrical seam-welding machine, the combination of means for supplying current to the parts to be welded, a pair of opposed continuously vibrating hammers disposed at the top and bottom of the seam, and means for simultaneously advancing said hammers together and in contact with the weld when a welding temperature is reached.

3. In an electrical seam-welding machine, the combination of means for supplying current to the parts to be welded, a vibratory hammer suitably disposed over said seam, a second vibratory hammer located below said seam, means for synchronously vibrating said hammers toward and away from each other, and means for simultaneously engaging said hammers with the top and bottom of the weld when a welding temperature is reached.

4. In an electrical seam-welding machine, the combination of means for supplying current to the parts to be welded, means for closing up the edges of the seam while the weld is being formed, and a pair of opposed vibratory hammers adapted simultaneously to engage the top and bottom of said weld.

5. In an electrical seam-welding machine, the combination of means for supplying current to the parts to be welded, means for advancing said parts together during the welding operation, opposed vibratory hammers synchronized with each other to vibrate in unison and disposed at the top and bottom of said weld, and means for simultaneously engaging the hammers with said weld at a suitable step in the welding operation.

6. In an electrical seam-welding machine, the combination of a plurality of independent supply circuits, and a plurality of independent electrodes closely disposed adjacent to but insulated from each other and each adapted to operate upon a sectionalized portion of a common continuous seam.

7. In an electrical seam-welding machine, the combination of a plurality of supply circuits, and a corresponding number of independent welding electrodes connected to said supply circuits and adapted to supply current to limited adjacent portions of a common continuous seam.

8. In an electrical seam-welding machine, the combination of a plurality of electrodes longitudinally arranged closely adjacent each other along one side of a continuous common seam and insulated from each other, and means for feeding said electrodes from independent supply circuits.

9. In an electrical seam-welding machine, the combination of means for advancing together the parts to be welded, a plurality of independent electrodes insulated from each other and distributed at closely spaced intervals along one side of a common continuous seam and adapted to contact with one of said parts, and means for feeding said electrodes with current from independent supply circuits.

10. In an electrical seam-welding machine, the combination of a plurality of pairs of electrodes insulated from each other and bridging a common continuous seam and longitudinally distributed along said seam, and means for supplying current to said electrodes from independent supply circuits.

11. In an electrical seam-welding machine, the combination of a plurality of independent electrodes insulated from each other and disposed closely adjacent to each other along one side of a common continuous seam and adapted to contact with the upper surface of one of said parts to be welded, an insulated anvil beneath each of said electrodes and adapted to support said part, and means for feeding current to said electrodes from independent supply circuits.

12. In an electrical seam-welding machine, the combination of a plurality of independent pairs of electrodes bridging and distributed closely adjacent to each other along a common continuous seam, insulated from each other and adapted to engage the upper surface of the parts to be welded, a plurality of pairs of insulated anvil members for supporting the parts beneath said electrodes, and means for supplying current to said electrodes from independent supply circuits.

13. In an electrical seam-welding machine, the combination of a plurality of electrodes distributed along one side of said seam, insulated from each other and independently yieldable, and means for simultaneously advancing said electrodes into contact with the part to be welded.

14. In an electrical seam-welding machine, the combination of opposed groups of separately insulated and independently yieldable electrodes disposed on either side of said seam and adapted to be raised and lowered into and out of contact with the parts to be welded, and insulated means for supporting said parts during the welding operation.

15. In an electrical seam-welding machine, the combination of a group of electrodes longitudinally distributed along one side of the seam, separately insulated, independently yieldable, and adapted to be moved into and out of contact with one of the parts to be welded, means for advancing together the parts to be welded while the weld is being formed, and insulated means for supporting the parts under the welding electrodes.

16. In an electrical seam-welding machine, the combination of two groups of independently yieldable electrodes bridging and longitudinally arranged along said seam, means for moving said groups of electrodes into contact with the parts to be welded, insulated means for supporting the parts to be welded beneath the electrodes, and means for advancing said parts toward each other during the welding operation.

17. In an electrical seam-welding machine, the combination of a series of independently yieldable electrodes adapted to be moved into and out of contact with one of the parts to be welded and distributed along one side of said seam, means for advancing said part toward the other part to be welded, and yieldable means permitting said electrodes to advance with said part.

18. In a seam-welding machine, the combination of means for advancing together the parts to be welded during the welding operation, and a pair of groups of independently yieldable electrodes, each of said groups being adapted to be moved into and out of contact with one of the parts to be welded, the electrodes being distributed along either side of said seam, and said groups being resiliently spaced apart to permit them to advance together with said parts.

19. In a can body seaming machine, the combination of a mandrel for forming the blank, means for clamping the blank to the mandrel, and means for trimming said blank following the clamping means.

20. In a can body seaming machine, the combination of a forming horn, means for feeding the blank into position adjacent to said forming horn, a reciprocatory gripper member adapted to clamp the blank to the forming horn, and means for trimming the longitudinal seam edges of said blank after the blank has been clamped to the horn.

21. In a can body seaming machine, the combination of a prismatic forming horn, a reciprocatory gripper member axially arranged adjacent to the forming horn, means for feeding the blank into position between said forming horn and said gripper member, means for advancing said gripper member to clamp the blank against the horn along a longitudinal line on its circumference, and means for trimming said blank operating after said clamping means.

22. In a can body seaming machine, the combination of a prismatic forming horn, means for feeding the blank into position adjacent to said horn, a reciprocatory gripper adapted to clamp the blank along a longitudinal line parallel with the axis of said horn, and shearing mechanism adapted to trim the blank operating after said gripping means and disposed on either side of said gripper member.

23. In a can body seaming machine, the combination of a prismatic forming mandrel, means for feeding the blank into position adjacent to said mandrel, a reciprocatory gripper adapted to clamp the blank along a longitudinal line on the circumference of the mandrel and parallel with its axis, and shearing mechanism disposed on each side of said gripper member and arranged to trim the blank after the latter has been clamped to the mandrel.

24. In a can body seaming machine, the combination of a prismatic forming horn, means for feeding the blank into position adjacent to said horn, a reciprocatory slide member, a yieldable gripper member carried by said slide and adapted to clamp the blank along a longitudinal line on the exterior of said horn and parallel with the axis thereof, and shearing mechanism disposed on either side of said gripper member adapted to trim the blank after the latter has been clamped to the horn, and carried by said slide.

25. In a can body seaming machine, the combination of a prismatic forming horn, means for feeding a blank into position adjacent to said horn, a reciprocatory slide, opposed links pivoted to the top of said slide, forming blocks pivoted to the links adjacent to the forming horn, and resilient means operative during the major portion of the movement of said slide to force said pivoted links toward each other to cause the blocks to hug the horn.

26. In a can body seaming machine, the combination of a cylindrical forming horn, a pair of blocks each having a curved surface adjacent to the horn and substantially of the same curvature, separable carriers for said blocks, a reciprocatory member upon which said carriers are separately mounted, resilient means operative during the major portion of the forming movement to force said carriers toward each other, and means for actuating said reciprocatory member whereby said blocks may be forced into engagement with a blank and partially circumferentially around said horn.

27. In a can body seaming machine, the combination of a prismatic forming horn, means for feeding a blank into a position adjacent said horn, a pair of pivoted former blocks normally located outside of the blank and adjacent said horn, pivots for said blocks having their axes parallel to the axis of the horn, means operative during the major portion of the forming operation for resiliently drawing said pivots toward each other, and means for reciprocating said pivots.

28. In a can body seaming machine, the combination of a cylindrical forming horn, means for feeding a blank into position adjacent said horn, a pair of symmetrically disposed formers, pivots for said formers having their axes parallel with the axis of the forming horn, a pair of opposed links carrying the pivots at their ends adjacent the horn, a reciprocatory member upon which said links are pivoted at their ends remote from the horn, and resilient means constantly operating to force said pivoted links toward each other during the movement of said reciprocatory member.

29. In a can body seaming machine, the combination of a forming horn, means for feeding a blank into position adjacent to and beneath said forming horn, a pair of opposed former blocks normally beneath the horn provided with a pair of surfaces adapted to substantially fit the circumference of said horn, said surfaces normally facing upwardly beneath the blank before the latter is formed, a pair of opposed pivots for said blocks having their axes substantially parallel with the axis of the horn, a pair of link mechanisms carrying the former block pivots at their upper ends and arranged to pivot about their lower ends, resilient means for forcing said link mechanisms toward each other, and means for reciprocating the lower pivoted ends of said link mechanisms.

30. In a can body seaming machine, the combination of a forming horn, means for feeding a blank into position beneath said forming horn, a blank-centering device beneath the horn and adapted to clamp the blank to the horn, a former block normally located at either side of said clamping device beneath the horn, each of said formers having a normally upturned curved surface adapted substantially to fit around the curvature of the horn, pivots for said formers having their axes substantially parallel with the axis of the horn, resilient means for forcing said formers together, and means for reciprocating said pivots.

31. In a can body seaming machine, the combination of a forming horn, means for feeding a blank into position beneath said forming horn, a reciprocatory gripper member beneath the horn and adapted to force the blank into clamping engagement with said horn, a pair of formers normally disposed beneath the horn and symmetrically arranged about the gripper, pivots for said formers resiliently spaced apart, and means for upwardly advancing said pivots whereby they move around the periphery of said forming horn.

32. In a can body seaming machine, the combination of a prismatic forming mandrel, a reciprocatory gripper member adapted to center the blank upon the horn and force it into clamping engagement therewith, and a pair of pivotally mounted reciprocating former blocks having their pivots resiliently spaced apart and adapted to slide around on either side of the periphery of said mandrel.

33. In a can body seaming machine, the combination of a prismatic forming mandrel, a reciprocatory gripper member for centering the blank and clamping the latter into engagement with the periphery of the forming mandrel, symmetrically disposed shearing mechanisms for trimming the edges of the blank after the later has been clamped to the horn, and a pair of symmetrically arranged forming members adapted to fold the blank around said forming mandrel.

34. In a can body seaming machine, the combination of a cylindrical forming horn, a reciprocatory gripping member adapted to clamp the blank to the periphery of the horn along a line parallel with the axis thereof, shearing mechanisms symmetrically arranged with reference to said longitudinal line and adapted to trim the edges of the blank after the latter has been clamped to the horn, a pair of formers symmetrically disposed about said longitudinal line, means for resiliently forcing together said formers, and reciprocatory pivot members upon which said formers are mounted.

35. In a can body seaming machine, the combination of a cylindrical forming horn, means for centering and trimming the blank beneath the horn, comprising a gripper member and symmetrically disposed shearing members on each side thereof, former blocks adapted to slide around said horn and wrap the blank around it, pivots for said former blocks, resilient means for forcing together said pivots, and reciprocatory members upon which said pivots are mounted.

36. In a machine for electrically welding the longitudinal seams of can bodies, the combination of current-conducting devices for electrically heating the edges of the seam to be welded, and a collapsible support for thet can body.

37. In a machine for electrically welding the longitudinal seams of can bodies, the combination of a resilient forming horn, resilient means for folding the blank around the horn, means for heating the edges of the seam electrically to a welding temperature, and means for contracting said horn during the welding operation.

38. In a machine for electrically welding the longitudinal seams of can bodies, the combination of an axially split forming horn, a pair of insulated former members adapted to push the edges of the seam into engagement with each other, and means for electrically heating the edges of said seam.

39. In a machine for electrically welding the longitudinal seams of can bodies, the combination of a forming horn around which the blank is folded to bring its edges into abutting relation, said horn being insulated beneath said abutting edges, means for electrically heating the edges of said seam to a welding temperature and for clamping the edges of the seam upon the surface of said horn, and means for forcing the edges of said seam together during the welding operation.

40. In a machine for electrically welding the longitudinal seams of can bodies, the combination of a cylindrical contractible forming horn around which said blank is adapted to be folded to bring its edges into abutting relation, means for electrically heating said edges and clamping them to the periphery of the horn, said horn being insulated beneath said abutting edges, and means for contracting said horn and forcing said edges together during the welding operation.

41. In a machine for electrically welding the longitudinal seams of can bodies, the combination of a cylindrical horn, means for folding and welding a can body around said horn, a cylindrical pipe coaxial with said horn and supported adjacent thereto and of a suitable diameter to embrace said can body, and means for propelling a can body from off the horn and into said pipe.

42. In a machine for electrically welding the longitudinal seams of can bodies, the combination of a forming horn, means for forming and electrically welding a can body around said horn, means for collapsing said horn to release the can body, a longitudinal cooling pipe arranged coaxial with said forming horn adjacent thereto and of a suitable diameter to embrace and retain said can body in a cylindrical shape, and means for axially propelling said can body from the horn into said pipe.

In witness whereof I have hereunto set my hand and seal, this 17th day of April, 1914.

HARRY H. HOOD. [L. S.]

Witnesses:
EMILIE ROSE,
C. A. SOANS.

Copies of this patent may be obtained for five cents each, by addressing the "Commissioner of Patents, Washington, D. C."